(12) United States Patent
Pekar

(10) Patent No.: US 7,892,374 B2
(45) Date of Patent: Feb. 22, 2011

(54) HOT PLATE WELDING PROCESS

(75) Inventor: Robert W. Pekar, Florence, MA (US)

(73) Assignee: Dielectrics Industries, Inc., Chicopee, MA (US)

( * ) Notice: Subject to any disclaimer, the term of this patent is extended or adjusted under 35 U.S.C. 154(b) by 975 days.

(21) Appl. No.: 11/712,659

(22) Filed: Mar. 1, 2007

(65) Prior Publication Data

US 2007/0284033 A1 Dec. 13, 2007

Related U.S. Application Data

(60) Provisional application No. 60/778,191, filed on Mar. 2, 2006.

(51) Int. Cl.
*B32B 37/00* (2006.01)

(52) U.S. Cl. .............. 156/73.1; 156/73.5; 156/228; 156/272.2; 156/277; 156/289

(58) Field of Classification Search ............... 156/73.1, 156/73.5, 73.6, 228, 272.2, 289, 379.6, 537, 156/580, 581, 583.1, 277

See application file for complete search history.

(56) References Cited

U.S. PATENT DOCUMENTS

| 4,451,318 A * | 5/1984 | Off et al. ..................... 156/353 |
| 5,022,109 A * | 6/1991 | Pekar ............................ 5/706 |

* cited by examiner

*Primary Examiner*—James Sells
(74) *Attorney, Agent, or Firm*—Cantor Colburn LLP

(57) ABSTRACT

A method for welding material including: applying a release material to a first film, the release material applied to locations where a weld is not desired; positioning a second film opposite the first film, the release material being positioned between the first film and the second film; placing the first film and the second film between planar press plates having planar surfaces and closing the press plates on the first film and the second film; applying energy to at least one of the press plates to weld the first film to the second film where the release material is absent.

10 Claims, 2 Drawing Sheets

HOT PLATE WELDING PROCESS

CROSS-REFERENCE TO RELATED APPLICATIONS

This application claims the benefit of U.S. provisional patent application Ser. No. 60/778,191, filed Mar. 2, 2006, the entire contents of which are incorporated herein by reference.

BACKGROUND

This invention relates to welding sheet materials. Thermoplastic materials made be joined using a variety of welding techniques. In an exemplary welding process, dies are used to form welded seams in one or more thermoplastic films. The dies include surface details (e.g., raised edges) that correspond to the locations where the welded seams are to be formed. Sheets of thermoplastic material are positioned between the dies and energy applied to the dies to melt the thermoplastic and form welded seams.

A drawback to this type of welding is that specific dies must be used for specific products.

SUMMARY

An embodiment of the invention is a method for welding material including: applying a release material to a first film, the release material applied to locations where a weld is not desired; positioning a second film opposite the first film, the release material being positioned between the first film and the second film; placing the first film and the second film between planar press plates having planar surfaces and closing the press plates on the first film and the second film; applying energy to at least one of the press plates to weld the first film to the second film where the release material is absent.

DESCRIPTION

Figure 1:
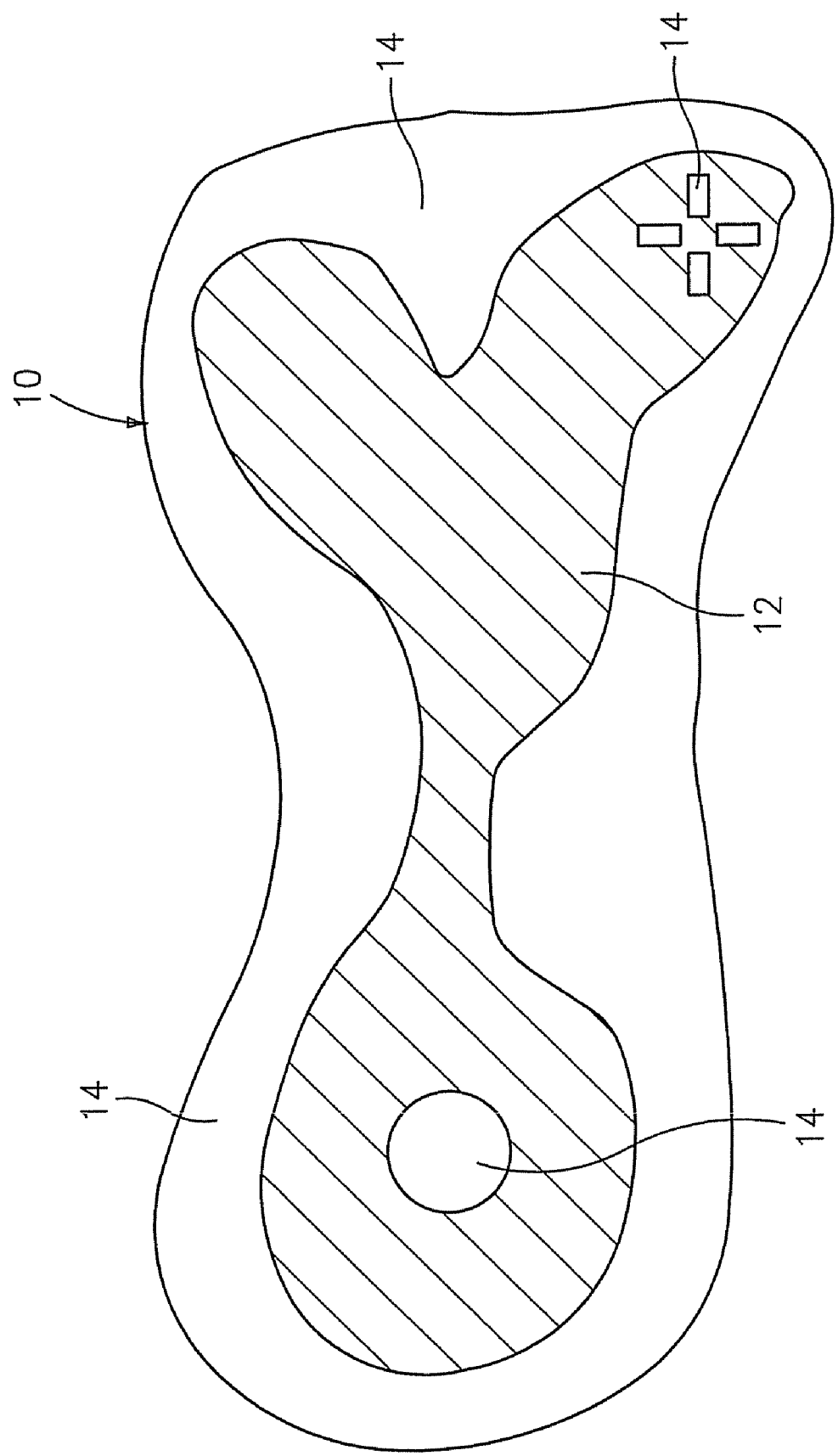
FIG. 1 is a top view of a film having a release coating printed thereon.

FIG. 1 is a top view of a film 10 having a release coating 12 printed thereon. The release coating 12 is shown as the cross-hatched region in FIG. 1. The film 10 may be any heat-weldable film, such as a thermo-plastic, a fabric treated with a thermoplastic material, etc. The film 10 may be made from thermoplastic sheet material such as polyurethane or polyvinylchloride. It is understood that other materials may be used such as other plastics, silicones, etc. and embodiments of the invention are not limited to thermoplastics.

The release coating 12 is printed on film 10 using a negative image mask. That is to say, the release coating 12 is printed on the film 10 where a welded seam is not desired. Film 10 is left blank where welds should occur, as shown in regions 14. The release coating may 12 be any known release coating such as that described in U.S. Pat. No. 5,022,109, the contents of which are incorporated herein by reference. The release coating 12 may be applied by conventional printing techniques, such as silk screening, rotogravure or flexographic process.

Figure 2:
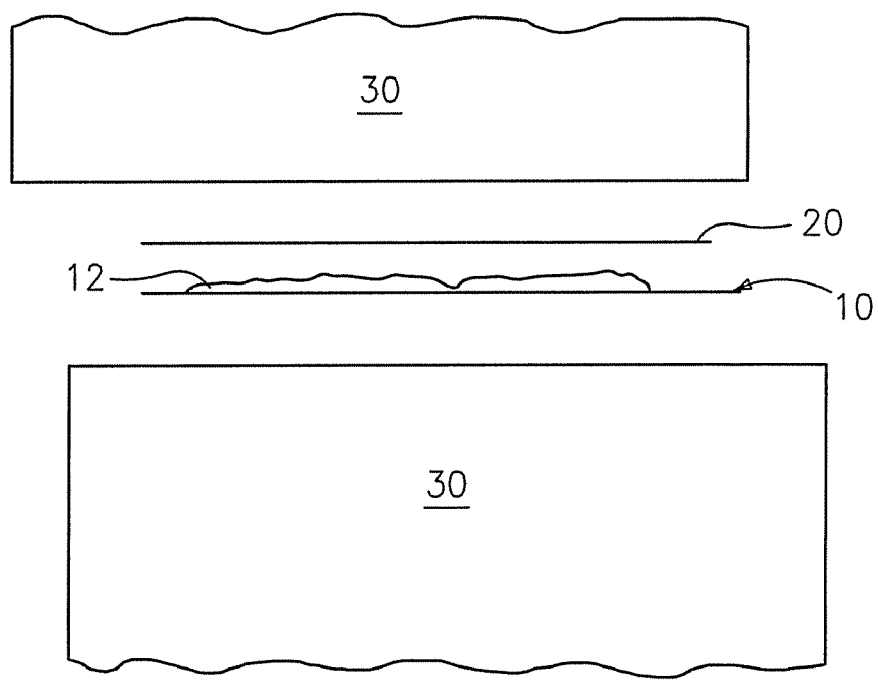
FIG. 2 is a side view of a welding apparatus.

Once the release coating 12 is applied to one film 10, a second film 20 is aligned with and positioned over film 10 as shown in FIG. 2. The two (or more) films are placed in a heat press having press plates 30. The heat press may be an impulse or hot plate press and heats the films 10 and 20 past their melt point using oversized blank plates 30. It is understood that any source of energy may be used to heat planar plates 30, including RF, vibration, ultrasound, etc. The plates 30 are planar and have no detail on them. Plates 30 only need to be larger than the print on films 10 and 20. The planar press plates 30 weld the two films 10 and 20 into a fluid tight bladder or other component. The areas where the release material 12 was applied remain unsealed.

Embodiments of the invention facilitate an in-line, web-based sealing system for high-speed bladder manufacture. The plates 30 are closed to apply pressure to the films 10 and 20, but only to heat the material, not to push a shape into the material. In exemplary embodiments, the heat press uses impulse welding which utilizes a nichrome wire (resistance wire) as a heating element. When the power is turned on, at least one of the heat plates 30 heat up rapidly. Then the power is shut off while the tool draws heat from the part. This is done while the part is still under compression.

Figure 3:
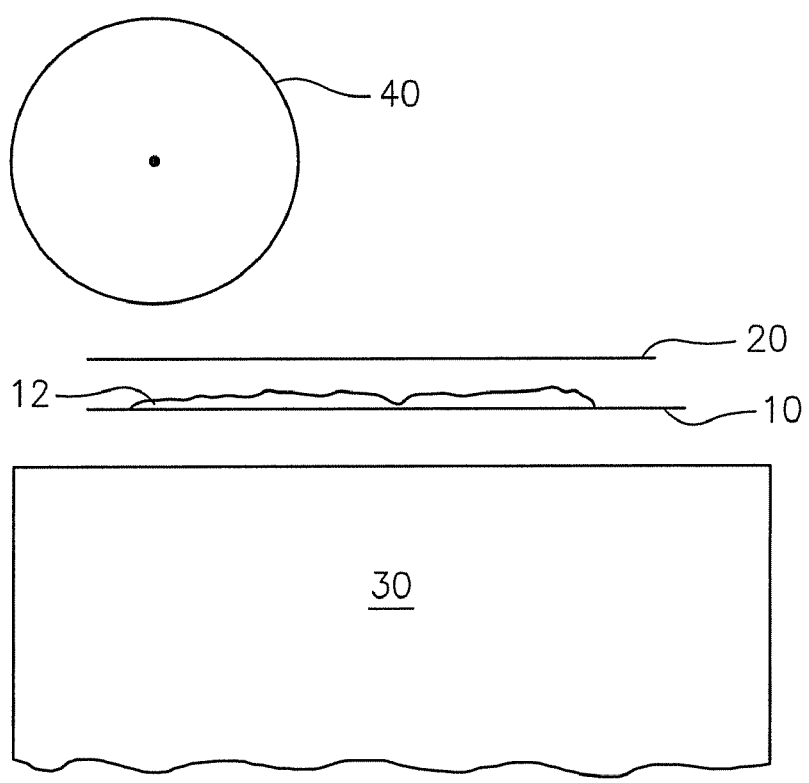
FIG. 3 is a side view of a welding apparatus in an alternate embodiment.

In an alternate embodiment of the invention, one of the plates 30 (e.g., the upper plate) is implemented using a heated rotating cylinder or drum having a surface without any detail. This arrangement is shown in FIG. 3. Drum 40 is heated by applying energy using known techniques and is rolled over the films 10 and 20 while applying pressure. The heated drum 40 welds the two films 10 and 20 into a fluid tight bladder or other component. The areas where the release material 12 was applied remain unsealed. This embodiment lends itself to in-line processes.

In an alternate embodiment, the release material 12 is a sheet material (e.g., die-cut) placed between films 10 and 20, in lieu of a printed release coating. In this embodiment, there would be two thermoplastic sheets 10 and 20 and a third non-compatible sheet of release material in between which acts as the release. The sheet of release material would prevent welding of films 10 and 20. All three sheets could be run assembled together and welded in an in-line process.

While this invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method for welding material comprising:
   positioning a release material on a first film, the release material applied to locations where a weld is not desired;
   positioning a second film opposite the first film, the release material being positioned between the first film and the second film;
   placing the first film and the second film between planar press plates having planar surfaces facing the first film and the second film and closing the press plates on the first film and the second film, the planar press plates being oversized to be larger than the release material between the first film and the second film;
   applying energy to at least one of the press plates to weld the first film to the second film where the release material is absent.

2. The method of claim 1 wherein:
the first film is a thermoplastic sheet material.

3. The method of claim 1 wherein:
the first film is a fabric treated with thermoplastic material.

4. The method of claim 1 wherein:
the release material is applied using a printing process.

5. The method of claim 1 wherein:
energy applied to at least one of the press plates is applied through a resistive heating element.

6. The method of claim 1 wherein:
energy applied to at least one of the press plates is applied from an RF source.

7. The method of claim 1 wherein:
energy applied to at least one of the press plates is applied through vibration.

8. The method of claim 1 wherein:
energy applied to at least one of the press plates is applied through ultrasound.

9. The method of claim 1 further comprising:
ceasing application of energy to the least one of the press plates while maintaining pressure on the first and second films.

10. The method of claim 1 wherein:
the release material is a sheet of release material.

* * * * *